US008260764B1

(12) United States Patent
Gruber (10) Patent No.: US 8,260,764 B1
(45) Date of Patent: Sep. 4, 2012

(54) SYSTEM AND METHOD TO SEARCH AND GENERATE REPORTS FROM SEMI-STRUCTURED DATA

(75) Inventor: Thomas Robert Gruber, Redwood, CA (US)

(73) Assignee: Open Text S.A., Luxembourg (LU)

( * ) Notice: Subject to any disclaimer, the term of this patent is extended or adjusted under 35 U.S.C. 154(b) by 2041 days.

(21) Appl. No.: 11/072,687

(22) Filed: Mar. 4, 2005

Related U.S. Application Data (60) Provisional application No. 60/550,519, filed on Mar. 5, 2004.

(51) Int. Cl.
*G06F 17/30* (2006.01)
(52) U.S. Cl. ...................................................... 707/708
(58) Field of Classification Search ................... 707/708
See application file for complete search history.

(56) References Cited

U.S. PATENT DOCUMENTS

| | | | | |
|---|---|---|---|---|
| 5,263,167 A * | 11/1993 | Conner et al. | ..................... | 707/4 |
| 5,495,605 A * | 2/1996 | Cadot | ............................... | 707/4 |
| 5,768,578 A * | 6/1998 | Kirk et al. | ..................... | 707/100 |
| 6,263,328 B1 * | 7/2001 | Coden et al. | ...................... | 707/3 |
| 6,263,332 B1 * | 7/2001 | Nasr et al. | ......................... | 707/5 |
| 6,341,277 B1 * | 1/2002 | Coden et al. | ..................... | 707/2 |
| 6,400,996 B1 * | 6/2002 | Hoffberg et al. | ................ | 700/83 |
| 6,418,448 B1 * | 7/2002 | Sarkar | ........................ | 707/104.1 |
| 6,523,028 B1 * | 2/2003 | DiDomizio et al. | .............. | 707/5 |
| 6,735,586 B2 * | 5/2004 | Timmons | .......................... | 707/3 |
| 6,826,568 B2 * | 11/2004 | Bernstein et al. | ................. | 707/6 |
| 6,882,995 B2 * | 4/2005 | Nasr et al. | ......................... | 707/3 |
| 6,985,905 B2 * | 1/2006 | Prompt et al. | ................ | 707/102 |
| 7,287,071 B2 * | 10/2007 | MacLean | ....................... | 709/224 |
| 2003/0018607 A1 * | 1/2003 | Lennon et al. | ..................... | 707/1 |
| 2004/0199497 A1 * | 10/2004 | Timmons | .......................... | 707/3 |
| 2005/0108001 A1 * | 5/2005 | Aarskog | ......................... | 704/10 |
| 2006/0167928 A1 * | 7/2006 | Chakraborty et al. | ......... | 707/102 |
| 2006/0206466 A1 * | 9/2006 | Boiscuvier et al. | ............... | 707/3 |
| 2006/0245641 A1 * | 11/2006 | Viola et al. | ..................... | 382/155 |
| 2007/0112714 A1 * | 5/2007 | Fairweather | .................... | 706/46 |

* cited by examiner

*Primary Examiner* — Mark A Radtke
(74) *Attorney, Agent, or Firm* — Sprinkle IP Law Group (57) ABSTRACT

Embodiments of the present invention provide a system and method for searching and reporting on semistructured data that can include dynamic metadata. One embodiment can comprise providing a user interface to a user based on an object type definition for an object type that allows the user to specify search criteria associated with a set of metadata, mapping the user search criteria to a query that comprises at least one structured query constraint and at least one unstructured query constraint, processing the query to search a set of data objects containing semistructured data associated with the object type according to the query and returning a set of results to the user. The search results can be returned to a user based on user-specified reporting parameters. Additionally, the reporting definition can be saved as an object for future execution.

21 Claims, 9 Drawing Sheets

SYSTEM AND METHOD TO SEARCH AND GENERATE REPORTS FROM SEMI-STRUCTURED DATA

RELATED INFORMATION

The present invention claims under 35 U.S.C. 119(e) the benefit of and priority to U.S. Provisional Patent Application No. 60/550,519, entitled "A System and Method to Generate Structured Reports From Information Retrieval Results", by Thomas Gruber, filed Mar. 5, 2004, which is hereby fully incorporated by reference herein.

TECHNICAL FIELD OF THE INVENTION

The present invention relates to systems and methods for report generation and more particularly to systems and methods for generating reports from semi-structured data.

BACKGROUND

Businesses, governmental organizations and other entities are becoming increasingly interested in understanding the context of the information they possess to enable them to evaluate current circumstances and plan for the future. That is, they wish to gain knowledge from information to enable them to better achieve their goals. To this end, the field of knowledge management has emerged. Knowledge management tools allow users to organize, search and present information in a manner that provides a better understanding of the information (i.e., puts pieces of information in context of other information). This can provide the user with greater comprehension of the information. As one example, an entity that provides a technical support call-center may store individual "trouble tickets" for customer problems. Knowledge management tools allow users to search the trouble tickets to determine, for example, if the customer is having a common problem with a product, how many trouble tickets are entered in a specific time period and so on. In this case, knowledge management can put a single trouble ticket in the context of other trouble tickets, helping the entity identify common problems and solutions. Additionally, knowledge management tools can allow users to collaborate on projects by allowing them to share documents and reports. This can allow one knowledge worker to efficiently distribute knowledge to other knowledge workers.

One of the primary mechanisms for providing knowledge to end users is reporting tools that allow a user to aggregate information based on user criteria. The user can use these tools to generate ad hoc reports that correlate data according to the user's specifications. In these systems, the information is generally saved as structured data in a database. The traditional reporting tools use a formal query language over the structured data stored in a relational database. For non-technical end-users, the reporting tools typically provide some form of graphical user interface that provides a more user friendly mechanism for entering the formal queries. These systems, for example, may provide the user with a graphical representation that allows the user to graphically select which columns of various tables should be presented in a report. Based on the user input, these reporting tools generate queries according to the formal query language (e.g., SQL queries) to generate the report.

Returning to the example of a technical support call center, the data for trouble tickets can be stored using a structured database schema. If the user wishes to search for all trouble tickets related to voice over IP phones, for example, the user can enter a product type (assuming product types are defined in the database) and the reporting tool will convert this to a formal query (e.g., SQL query), issue the query and display the results. These tools operate over the structured data stored according to a fixed schema to return results. If the company wishes to change the data collected in trouble tickets, say adding a problem code, the database scheme must be changed to accommodate the new field. Additionally, the reporting tool will have to be reprogrammed to issue SQL queries seeking particular problem codes.

Reporting tools that rely on a well defined database schema suffer an additional shortcoming in that they are not well suited to dealing with unstructured or semistructured data. Unstructured data is data that has no predefined internal structure such as text document and image data. For example, a typical word processing document includes unstructured data since there is no predefined internal structure to the text and images embedded in the document. Semistructured data is a mix of structured data with unstructured data. The structured data is metadata such as the author, date, title and so forth that provide a loose structure for the data. The metadata fields may be structured or unstructured data; for example, date information can be represented in a way that has a predefined internal structure (day, month, year) whereas the title of a document has no structure other than being text. The metadata can also be static or dynamic. Static metadata is more like structured data in that it provides predefined elements of a data record that typically remain the same over records. Dynamic metadata, on the other hand, allows the definition of fields to change over records.

Traditional method of database queries are extremely limited in their functionality for pattern matching against unstructured data. Information retrieval tools, on the other hand, provide matching against patterns in unstructured data, such as word matching. However, traditional information retrieval technologies do not allow for structured queries against dynamic metadata. Consequently, neither information retrieval tools nor structured database query tools provide a satisfactory mechanism for searching and retrieving data records structured using dynamic metadata.

SUMMARY OF THE INVENTION

Embodiments of the present invention provide a system and method of reporting on semistructured data that eliminates, or at least substantially reduces, the shortcomings of prior art systems and methods for data searching and reporting.

Embodiments of the present invention provide a system and method for allowing an end user to run and store ad hoc searches and reports on semistructured data that can include dynamic metadata. According to one embodiment of the present invention, data objects (e.g., documents, records or other data objects known in the art) are associated with an object type that has an object type definition. The object type definition specifies the metadata for the data object. The metadata specified in the object type definition can be dynamic such that it changes over time. Consequently, data objects associated with the same object type may use different metadata.

The metadata in the data objects can be indexed into an information retrieval ("IR") engine (e.g., a search engine) using, for example, token patterns. When a user wishes to run a search or report for a particular object type, embodiments of the present invention can present the user with a graphical user interface that provides the appropriate query options based on the object type definition. The user inputs are mapped to the formal query language of the IR engine. For example, the user inputs can be mapped to structured and unstructured query constraints. When a user defines a query, the query can be saved as a data object (e.g., a document or folder). When the user selects (e.g., "opens" the object), the associated query is run using the IR engine. This allows the user to create "virtual folders" whose contents are dynamically computed based on the saved query.

One embodiment of the present invention includes a method for searching semistructured data that comprises defining an object type with an object type definition that has one or more attributes, instantiating a set of data objects associated with the object type, with each data object having structured data and unstructured data a set of metadata corresponding to the one or more attributes, providing a user with a user interface based on the object type definition that allows the user to specify search criteria (e.g., full text search criteria and search criteria associated with metadata), mapping the search criteria to a query, processing the query to search the set of data objects according to the query, and returning a set of results to the user. It should be noted that the query can include at least one structured search query constraint based on a search criterion associated with a piece of metadata and at least one unstructured search constraint (e.g., based on a search criterion specified for a piece of metadata and/or a full text search criterion). It should be further noted that the data objects can contain dynamic metadata. The set of results can be returned to a user as an ad hoc report, a list of appropriate data objects or in any other suitable manner.

Another embodiment of the present invention includes a method for searching semistructured data that comprises providing a user interface to a user based on an object type definition for an object type that allows the user to specify search criteria associated with a set of metadata, mapping the user search criteria to a query that comprises at least one structured query constraint and at least one unstructured query constraint, processing the query to search a set of data objects containing semistructured data associated with the object type according to the query and returning a set of results to the user.

Yet another embodiment of the present invention includes a computer program product for searching semistructured data comprising a set of computer instructions stored on a computer readable medium. The set of computer instructions comprise instructions executable to provide a user interface based on an object type definition that allows the user to specify search criteria associated with a set of dynamic metadata, map the user search criteria to a query, process the query to search a set of data objects containing semistructured data associated with the object type according and return a set of results to the user.

Embodiments of the present invention provide an advantage over prior art data searching and reporting methods by providing a user friendly mechanism to allow non-technical users to configure and run searches on a corpus comprising semi-structured, dynamic metadata without detailed programming knowledge.

Embodiments of the present invention provide another advantage by generating reports using full-text searches that also satisfy relational constraints.

Embodiments of the present invention provide yet another advantage by saving a report definition as a semi-structured query.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein:

FIG. 8 illustrates an example .csv file generated from the "Tasks Report";

DETAILED DESCRIPTION

Preferred embodiments of the invention are illustrated in the FIGURES, like numerals being used to refer to like and corresponding parts of the various drawings.

Embodiments of the present invention provide a system and method for allowing an end user to run and store ad hoc searches and reports on semistructured data. According to one embodiment of the present invention, data objects (e.g., documents, records or other data objects known in the art) are associated with an object type that has an object type definition. The object type definition specifies the metadata for the data object. For example, if customer complaints are stored in a database, each customer complaint can be associated with a CustomerComplaint object type that has a definition specifying the metadata for customer complaint records (i.e., instances of the Customer Complaint object type). The metadata specified in the object type definition can be dynamic such that it changes over time. Consequently, customer complaints associated with the same Customer Complaint object type may use different metadata.

The metadata in the data objects is indexed into an information retrieval ("IR") engine (e.g., a search engine) using, for example, token patterns. When a user wishes to run a report for a particular object type (e.g., CustomerComplaints), embodiments of the present invention can present the user with a graphical user interlace ("GUI") that provides the appropriate query options based on the object type definition. The user inputs are mapped to the formal query language of the IR engine. For example, the user inputs can be mapped to pattern matching constraints for the indexed tokens. When a user defines a query, the query can be saved as a data object (e.g., a document or folder). When the user selects (e.g., "opens" the object), the associated query is run using the IR engine. This allows the user to create "virtual folders" whose contents are dynamically computed based on the saved query.

Figure 1:
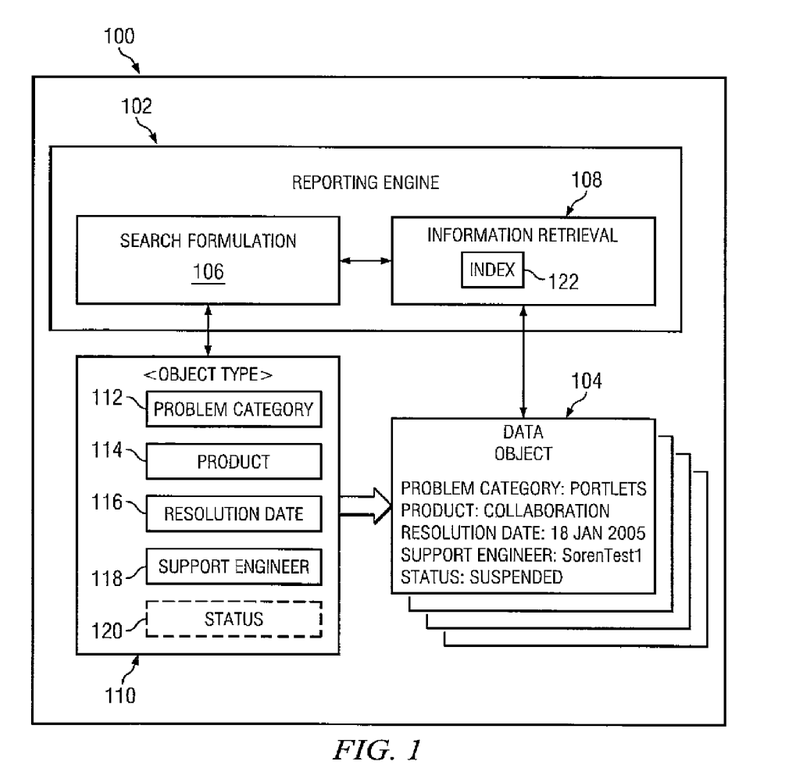
FIG. 1 is a diagrammatic representation of one embodiment of a system for searching data objects corresponding to a user query.

FIG. 1 is a diagrammatic representation of one embodiment of a system 100 for finding data objects corresponding to a user query. In system 100, a reporting engine 102 can locate data objects (e.g., records, files or other data objects) from a set of data objects 104 according to a user query. The set of data objects 104 can be stored using a database, file system or other data storage schemes known in the art and can be distributed across multiple storage media. Reporting engine 102 can provide a search formation engine 106 that can provide a GUI that allows a user to formulate queries in a user-friendly manner. Search formulation engine 106 forwards the queries to an information retrieval ("IR") engine 108 which processes the queries to locate the corresponding data objects.

Each data object in the set of data objects 104 represents an instance of an object type having an object type definition. There may be multiple object type definitions if system 100 stores data objects for multiple object types. An object type definition (e.g., object type definition 110) includes a set of attributes that is relevant to queries for that object type. Each attribute can itself be a data object of an object type with an object type definition. An attribute can specify the data type of associated data, parameters that affect display and other information. In an instantiation of the object type of object type definition 110, the attributes of the object type definition represent metadata that can have associated data of the value type (e.g., a name value, date value, other value type). Additionally, the attributes can specify metadata associated with unstructured data (e.g., title metadata associated with a free description area). The data objects in set of data objects 104 are therefore semistructured in that they can include both a metadata structure as ascribed by the object type definition and unstructured data.

As an example, the set of data objects 104 can include customer complaints that are instantiations of a "CustomerComplaint" object type. The CustomerCompliant object type can include attributes for a Problem Category 112, Product 114, Resolution Date 116 and Support Engineer 118. In this example, all customer complaint documents (i.e., customer complaint data objects) are associated with the object type definition for CustomerComplaint, which in turn specifies that "Problem. Category", "Product", "Resolution Date" and "Support Engineer" would be relevant categories to search when looking for customer complaints. Other attributes can include, for example, a Description attribute that is associated with a free text description of a customer complaint. Each attribute can itself be a data object (e.g., Product attribute 114 can be a data object of a Product object type) that specifies, for example, the data type (discrete, date, free text or other data type), a display name, a logical name and other parameters. The attributes represent metadata that can have associated values in the instantiated customer complaint documents (or other customer complaint data object).

Object type definitions can change dynamically. For example, the CustomerComplaint object type definition can be modified to add a Status attribute (represented at 120). New data objects instantiated based on the CustomerComplaint object type definition will include data for the status, whereas older objects instantiated from the Customer Complaint object type definition (i.e., instantiated before the modification) will not. Each data object of a particular object type can be associated with that object type even if the object type definition changes. Consequently, two data objects can be viewed as being of the same object type even if the object type definition changes between the times when the two data objects are instantiated. Returning to the previous example, both the customer complaint with the status field and the older customer complaint without the status field are associated with the CustomerComplaint object type objects, even though the object type definition changed.

Turning to searching set of data objects 104, IR engine 108 can incorporate various information retrieval tools that allow for indexing of fields including, but not limited to, those provided by Verity, Inc. of Sunnyvale, Calif. and Convera Corporation of Vienna, Va. The semistructured data objects (e.g., set of data objects 104) are indexed for search by IR engine 108 in index 122. At least a portion of the metadata and associated data can be indexed as token patterns. If a customer complaint object has metadata for author, title and date, this metadata may be relevant to all data objects in set of data objects 104, including non-customer complaint objects. According to one embodiment, this static metadata can be indexed as structured fields. The Problem Category metadata, however, may only be relevant to customer complaint data objects. Other data objects may include metadata such as "geographical region" which are only relevant to other applications. Metadata that varies between data objects in set of data objects 104 (i.e., dynamic metadata that varies between instances of the same object type or instances of different object types) can be indexed using token patterns. For example, the pattern for Problem Category of a particular customer complaint listing "server error" as the Problem Category can be the word sequence "$field-name probcategory $field-value server error $end-field" and the pattern for the geographical region field for a data object listing the Pacific Northwest as the geographical region can be the word sequence "$field-name geographic region $field-value pacific northwest $end-field".

It should be noted, the underlying information retrieval tool may only allow for indexing of a predefined number of fields. The data objects in set of data objects 104, however, may include additional metadata by which the data objects are to be searched. As will be discussed below, the search formation engine 106 can compensate for this by the way in which it formulates queries to information retrieval engine 108. Other embodiments of the present invention can utilize IR tools that do not use field indexing or allow indexing of an arbitrary number of fields. One example of another IR tool that can be used is Autonomy IDOL Server by Autonomy, Inc. of San Francisco Calif.

A user can formulate a search to search set of data objects 104 using the GUI provided by search formulation engine 106. Through the GUI, the user can select an object type (e.g., CustomerComplaint) and search formulation engine 106 can present the user with a search screen that is based on the object type definition for the CustomerComplaint object. The search screen can contain text boxes, check boxes, date boxes and other areas that the user can enter search criteria. The manner in which search formulation engine 106 represents a particular piece of metadata can be dictated by the corresponding attribute of the object type definition. For example, Product attribute 114 can specify that the product attribute should be displayed as "Product" and that it is a discrete data type. Because it is a discrete data type, search formulation engine 106 can represent the data value choices for "Product" in a drop down menu.

When a user submits a search, the search parameters entered by the user are mapped to the formal query language used by IR engine 108. For example, a search for "server error" in the Problem Category can be mapped to ("$field-name probcategory $field-value server error $end-field"). For a search parameter for an attribute that is not an indexed field, search formulation engine 106 can map the search parameter to a query using other mechanisms, such as Boolean expressions, word proximity searches or other unstructured pattern matching search schemes supported by IR engine 108. For example, if resolution date is not an indexed field for IR engine 108, but the user wishes to search for all customer complaints resolved in 2004, search formulation engine 106 can form the query "resolution date" NEAR-5 "2004" to search for all customer complaints that have 2004 within five words of "resolution date". The full query for "server errors" that were resolved in 2004 can therefore be:

("$field-name probcategory $field-value server error $end-field") AND "resolution date" NEAR-5 "2004"

In this example, a structured query constraint such as the "the field Problem Category must be equal to the string 'server error'" is combined with an unstructured pattern matching constraint such as "the document must contain the phrase 'resolution date' within five words of the string '2004'." The use of the unstructured pattern matching, in this example, essentially allows for the specification of an arbitrary number of name value pairs even when IR engine 108 does not support indexing of an arbitrary number of fields.

Search formulation engine 108 can also provide for full text pattern match searching of the data objects in set of data objects 104. For example, if the customer complaint objects allow a user to write a free text description of a problem, search formulation engine 106 can present the user with a text box that allows the user to enter query terms for searching the entire contents of the data object. When the user enters search terms, search formulation engine 106 can pass a query to IR engine 108 that includes a full text query with the specified search terms and any constraints specified by the user based on the metadata. IR engine 108 is responsive to the query to return a list of data objects from set of data objects 104 that meet the constraints specified by the user and contain the full text search term (and/or variants thereof if IR engine 108 supports synonym searching, wildcarding or other language processing mechanisms known in the art). Thus, reporting engine 102 can combine full text pattern matching constraints on unstructured data with structured constraints on the metadata.

Search formulation engine 106 can save the query as a query object (e.g., a folder, file, document or other data object). When the user (or another user) opens the query object, reporting engine 102 can automatically run the search to return the results. Thus, the query object can act as a "virtual folder" with contents that are generated dynamically based on the saved query. According to another embodiment, if the format for a report is specified as a spreadsheet or other document, the effect of opening the query object can be dynamically generate a document such as the spreadsheet. In this case, the query object acts as virtual document whose contents are generated dynamically when the object is opened.

Embodiments of the present invention thus provide a system that allows a user to run ad hoc searches on data objects (documents, records and other data objects) that contain semistructured data. The data objects can be represented by a dynamic metadata model in which the metadata for data objects of the same object type can change across the data objects. A GUI can provide the user with representations of the metadata in the data objects based on the object type definition for the data objects along with full text search options. The search criteria presented by a user can mapped to the formal query language used by an IR tool. This can include mapping name value pairs to structured query constraints and pattern matching constraints and mapping full text search criteria to full text query expressions. The user specified queries can be saved as query objects for latter instantiation and collaboration.

It should be noted that while reporting engine 102 is illustrated as having a search formulation engine 106 and an IR engine 108, the present invention can be implemented according to any suitable programming architecture, including as a monolithic program, a set of separate programs that can communicate through application protocol interfaces ("API") and programmatic calls, or other programming scheme known in the art. Additionally, embodiments of the present invention can include computer instructions distributed across multiple computers in a network. The computers instructions can be coded using any suitable programming language.

Figure 2:
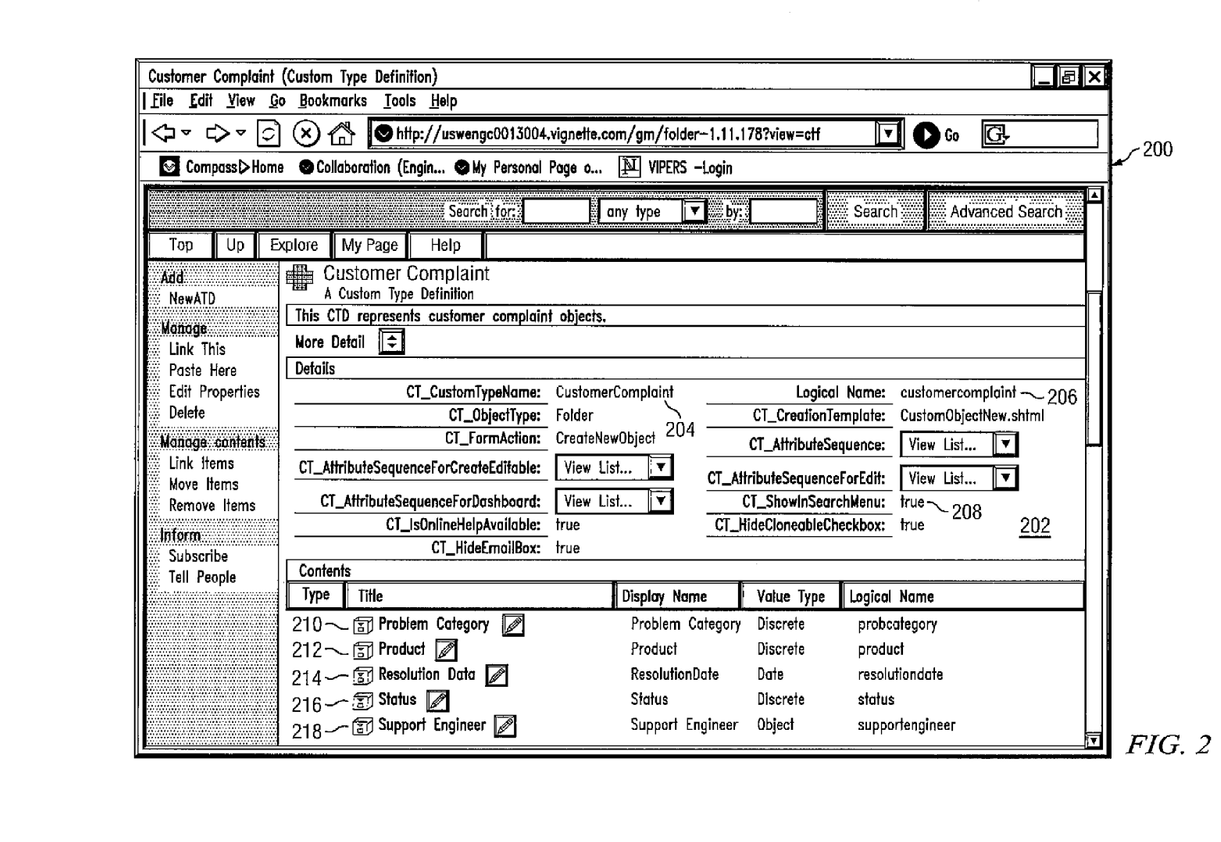
FIG. 2 is a diagrammatic representation of defining an object type according to one embodiment of the present invention.
Figure 5:
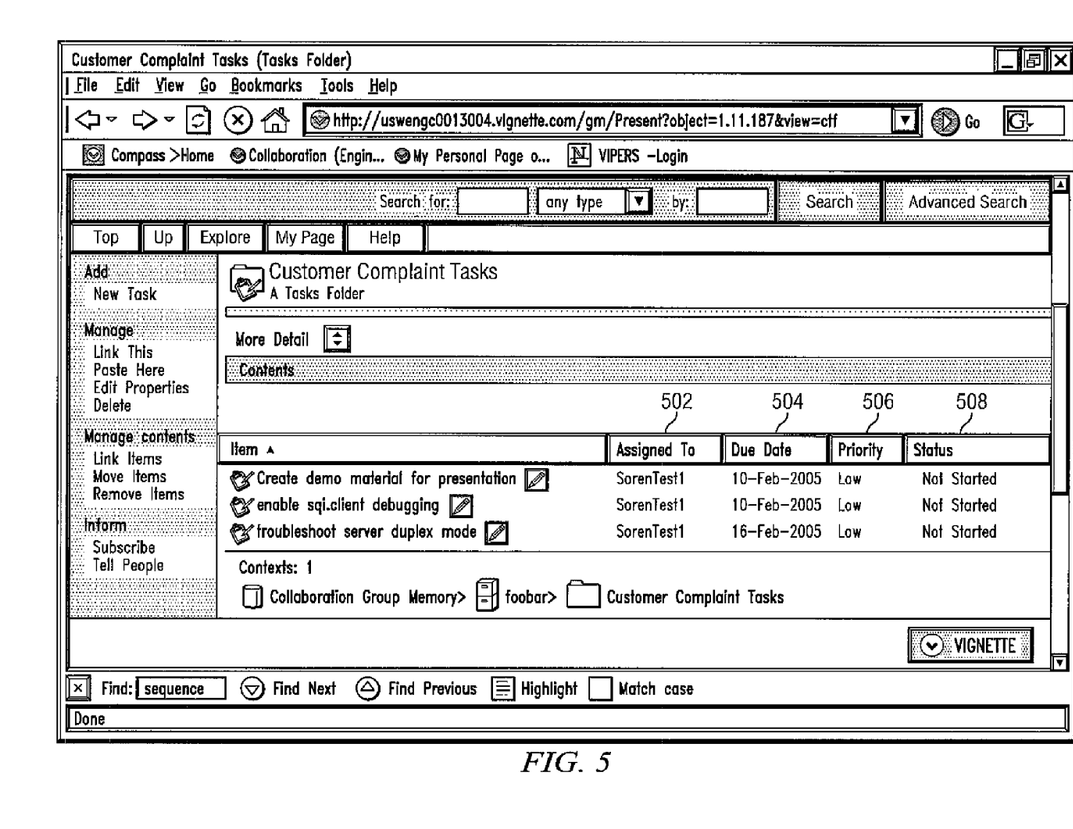
FIG. 5 is a diagrammatic representation of one embodiment of a "dashboard" screen for viewing data objects.

FIG. 2 is a diagrammatic representation of defining an object type. Screen 200 illustrates a user defining the CustomerComplaint object type. In details section 202, the user can specify attributes that, according to one implementation, must be specified for all object type definitions, including, for example, the name (represented at 204), the logical name (represented at 206) and whether the object type will be visible for search purposes (represented at 208). Screen 200 also illustrates specifying attributes (e.g., Problem Category attribute 210, Product attribute 212, Resolution Date attribute 214, Status attribute 216 and Support Engineer attribute 218). Each attribute is associated with one or more parameters including the name by which the attribute will be displayed in Customer Complaint documents, the value type of the associated data and the logical name of the attribute. The search formulation engine, as illustrated in FIG. 5, can use these to represent metadata to a user for specifying search criteria. Each attribute can itself be a data object of an object type.

Figure 3:
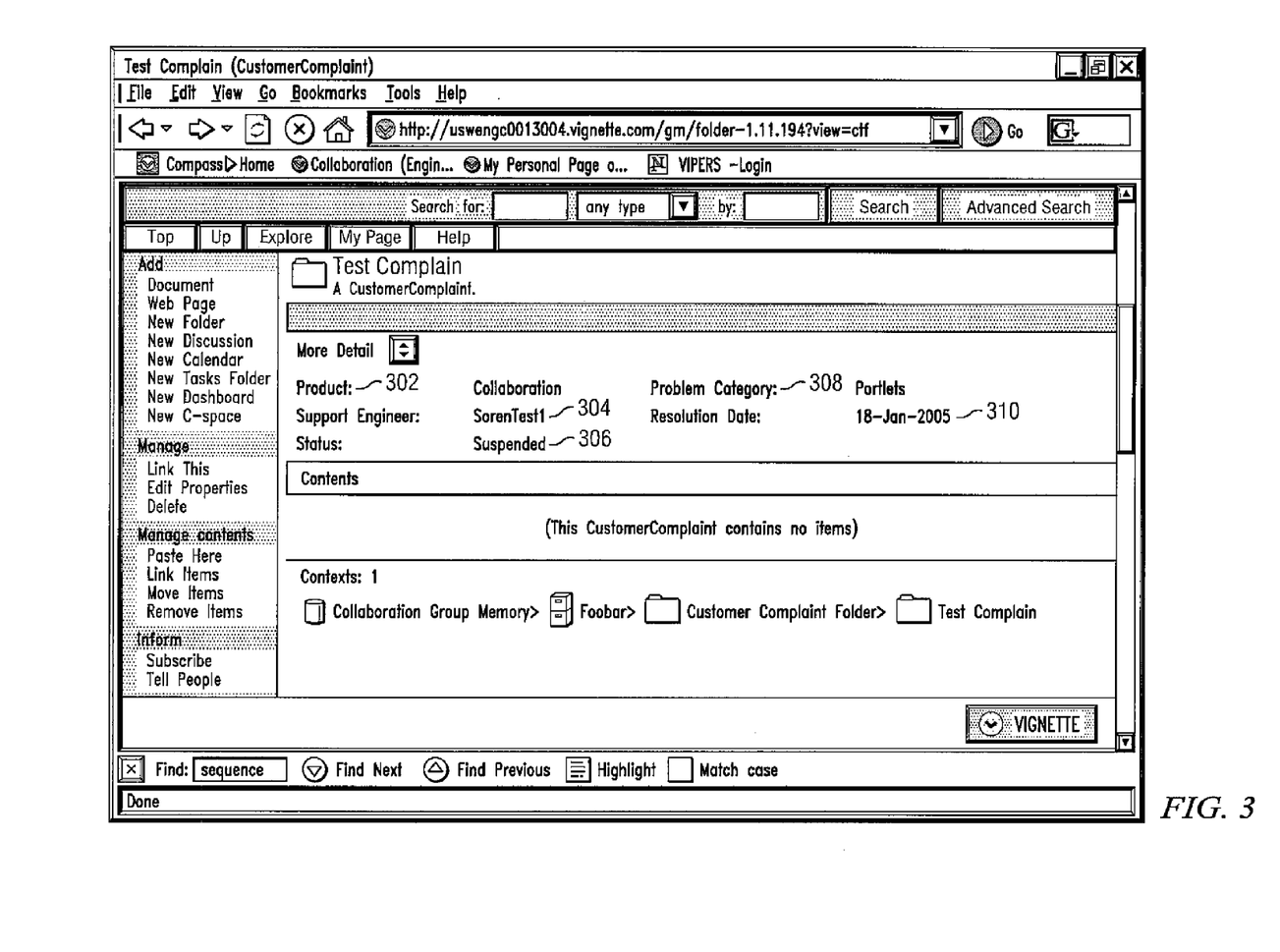
FIG. 3 is a diagrammatic representation of an instantiation of a Customer Complaint data object based on the object type definition provided in the example of FIG. 2.

FIG. 3 is a diagrammatic representation of an instantiation of a Customer Complaint data object based on the object type definition provided in the example of FIG. 2. In the example of FIG. 2, the "Test complain" data object includes Product metadata 302, Support Engineer metadata 304, Status metadata 306, Problem Category metadata 308 and Resolution Date metadata 310 with associated data values.

Figure 4:
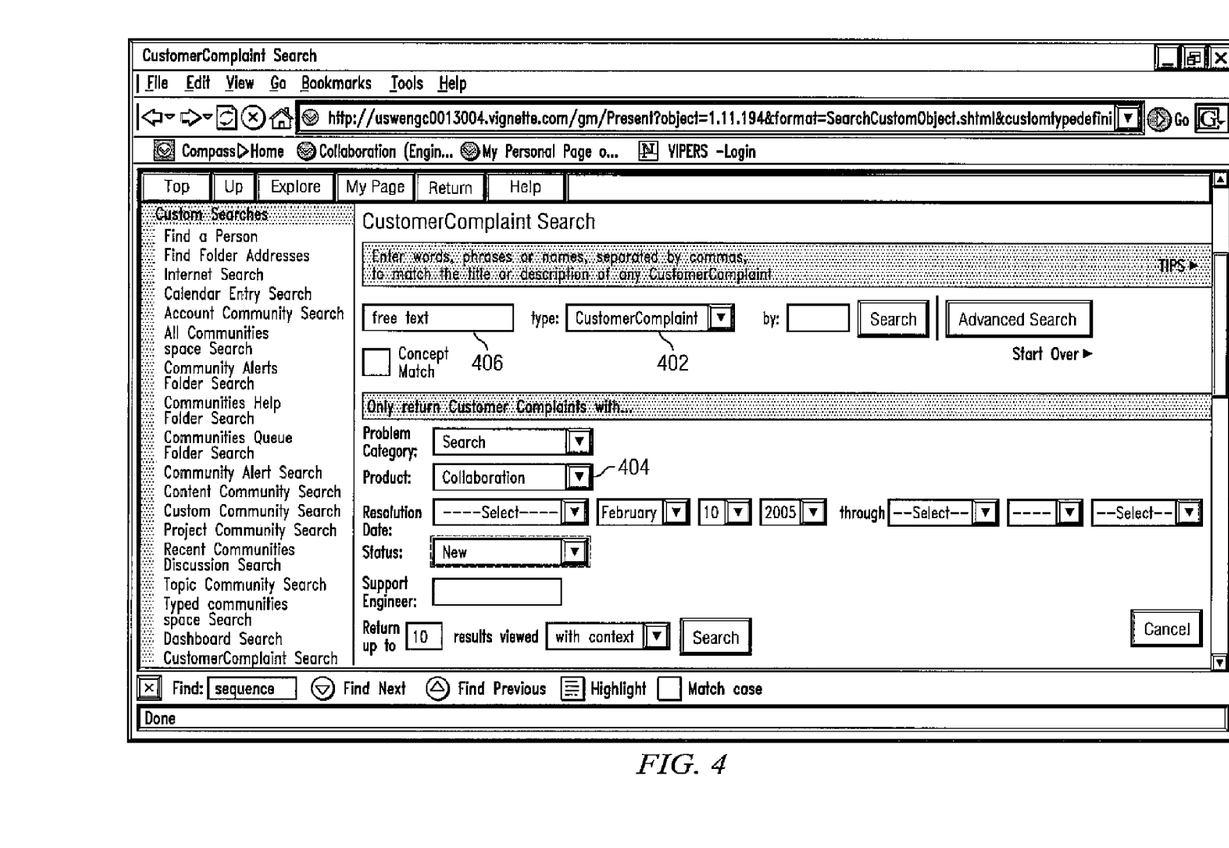
FIG. 4 is a diagrammatic representation of a screen shot for a GUI presented by a search formulation based on a selected object type.

FIG. 4 is a diagrammatic representation of a screen shot for a GUI presented by a search formulation engine (e.g., search formulation engine 106 of FIG. 1) based on a selected object type (e.g., CustomerComplaint, represented at 402). Based on the selected object type, the search formulation engine can access the object type definition and present the appropriate metadata for which associated values can be searched. The manner in which the search criteria for a particular piece of metadata is entered can be based on, for example, the value type specified by the corresponding attribute in the object type definition. For example, for each piece of metadata in the data objects that is associated with a discrete value (see FIG. 2), the associated value to be searched can be specified using a drop down menu. Accordingly, the product name can be selected from drop down menu 404 for the Product metadata in the data objects. While, in the example of FIG. 4, a user can specify search criteria for each piece of metadata, other data type definitions may specify that a user can not specify search criteria for particular pieces of metadata. Additionally, the search formulation engine can provide a full text search box 406 that can allow a user to specify full text search terms that are to be located regardless of where they appear in the data object. This facilitates full text searching of the data objects. If a full text search is entered, the search criteria specified for the metadata essentially limit the search results returned based on the full text search criteria.

A user can save a query as a query object that can appear as a file, a folder a document or other data object. When the query object is selected (i.e., opened), the query is run to generate dynamically generate the results. The query object, in this case, acts a virtual file or folder with the contents being generated when the query object is selected. The user can share the query object with other users, allowing the other users to run the same search without requiring that the search results be persistently maintained. According to other embodiments of the present invention, the search results can be saved, can be output as a report and otherwise stored or presented.

It should be noted that the code for generating a search screen can be generic, in that it is not tied to a particular object type definition. Instead, when a user selects an object, the search formulation engine analyzes the subobjects (i.e., the attributes) in the object type definition according to display rules and displays the appropriate information and menus for that attribute. Consequently, once the search formulation engine is made aware of a new object type definition, the search formulation engine can provide a search screen for that object without reprogramming or recompilation.

FIG. 5 is a diagrammatic representation of one embodiment of a "dashboard" screen for viewing data objects of a "Customer Task" type. Again, the information displayed in the screen for representing the data objects can be based on the object type definition for the appropriate object type. In this case each data object is represented with the metadata and associated values for Assigned To (represented at 502), Due Date (represented at 504), Priority (represented at 506), Status (represented at 508) and other metadata.

Figure 6:
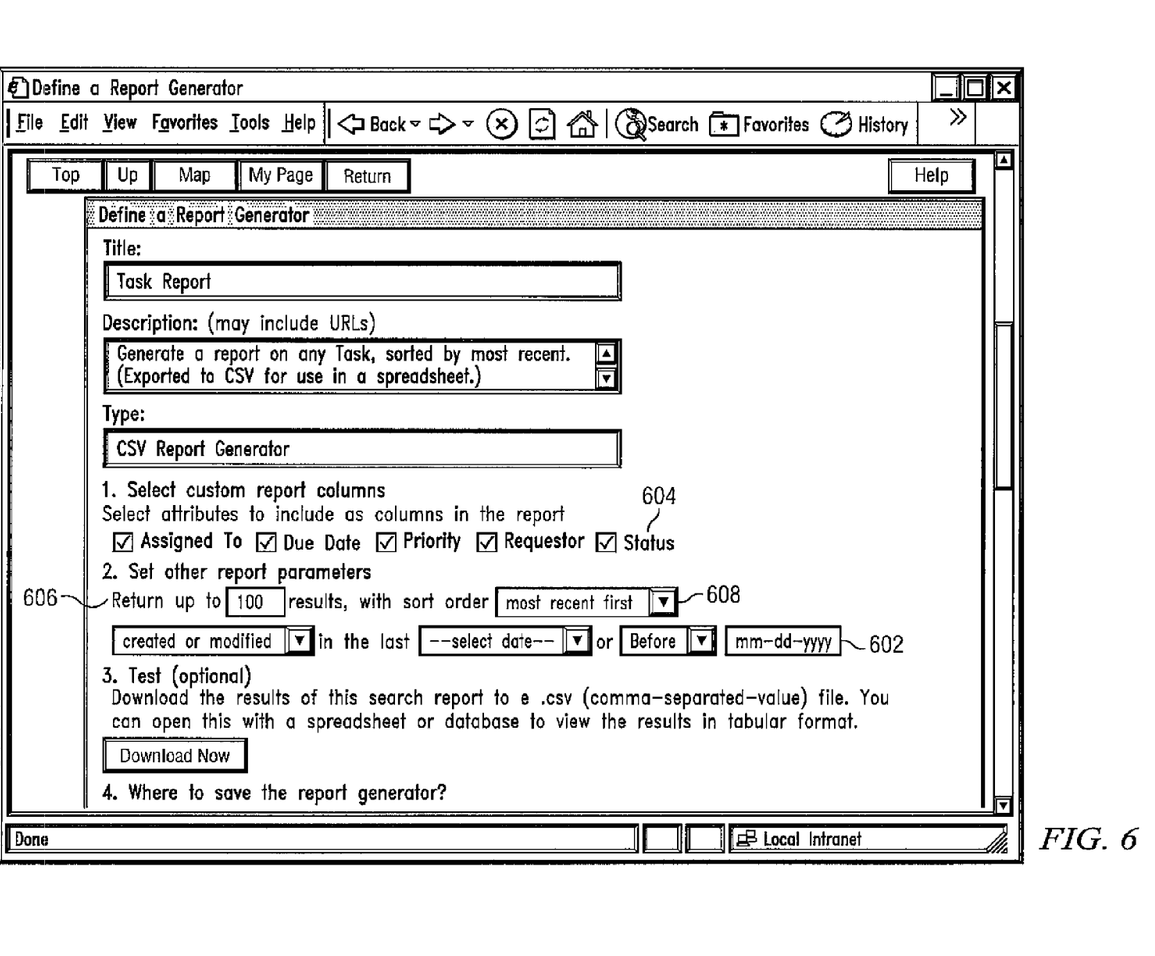
FIG. 6 is a diagrammatic representation of a screen presenting a reports form.

FIG. 6 is a diagrammatic representation of a screen presenting a reports form. The reports form allows a user to specify reporting parameters for reporting the results of a query. As with the search screen of FIG. 4, the manner in which information for a particular piece of metadata is specified can depend on the underlying object type definition. In FIG. 6, the user is choosing to define a report called "Tasks Reports" run on "Tasks" data objects. The reporting screen allows the user to specify reporting criteria for a created date or last modified date (represented at 602). For other metadata, however, the user can simply specify whether the associated values for the metadata should appear in the report. This is represented by the check boxes 604. For other pieces of metadata (e.g., "Contributed By", shown in FIG. 8) the user may be given no options as the reporting engine is configured to always output associated values for these pieces of metadata in a report. The user can also specify other report parameters (e.g., how many results to return, the order in which the results are displayed and other options). In the example of FIG. 6, the user is choosing to see up to 100 results (represented at 606) sorted by most recent first (represented at 608). The report, in this example, is output to a .csv (comma-separated-value) file. It should be noted that while the report on FIG. 6 is generated based on the results of a previously defined search, the search and report can be defined by the user in the same interface.

Figure 7:
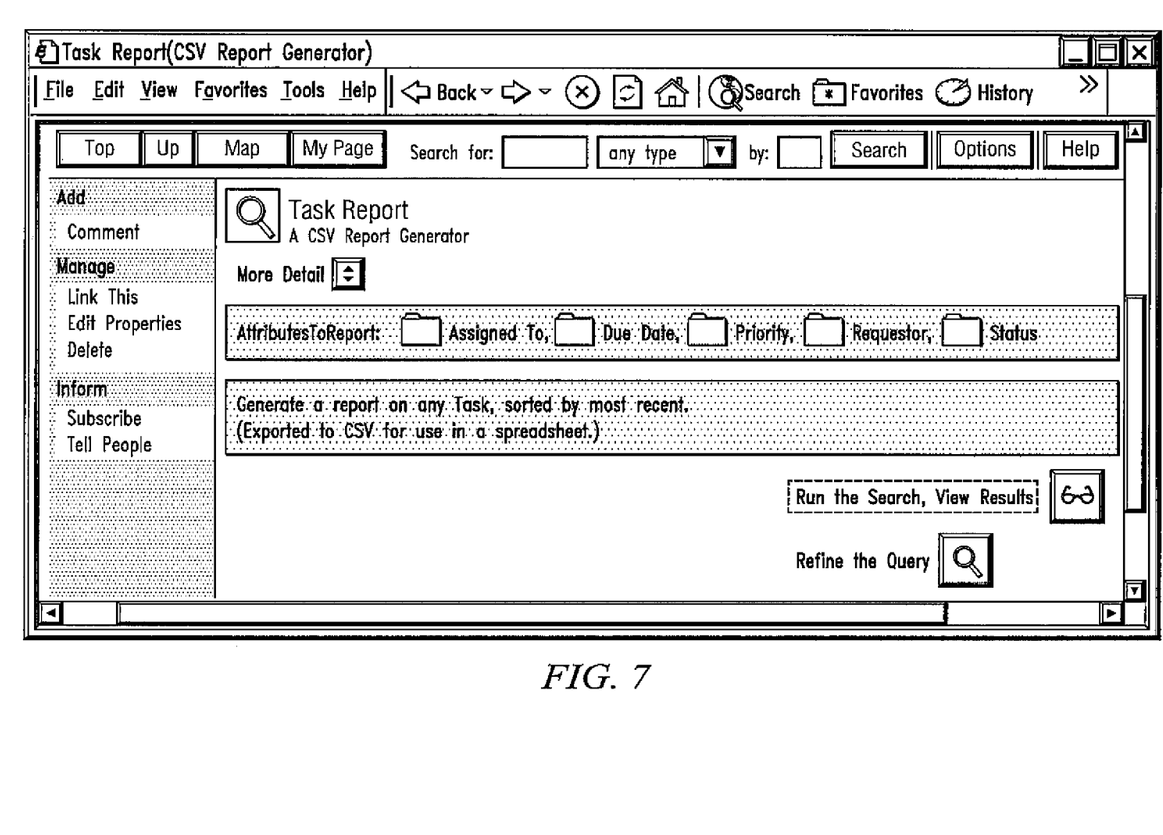
FIG. 7 illustrates one embodiment of an expanded view of a data object along with the attributes that can be chosen for reporting.

FIG. 7 illustrates one embodiment of an expanded view of the report definition for the "Tasks Report" data object including the attributes chosen for reporting. FIG. 8 illustrates an example .csv file generated from the "Tasks Report". It can be noted from FIG. 8 that the Task data objects can contain additional metadata than was presented to the user in the reporting form of FIG. 6. For example, the Task data objects can include Name metadata (column 802) and Contributed By metadata (column 804). The tasks report data object of FIG. 7 can be represented to users, for example, as a file. When a user selects the tasks reports data object, the file of FIG. 8 is generated. As the underlying task data objects change through additions or deletions of task data objects, the resulting file can change accordingly. That is, when a user selects the Tasks Report data object, the resulting file will reflect the current state of the task data objects.

Figure 9:
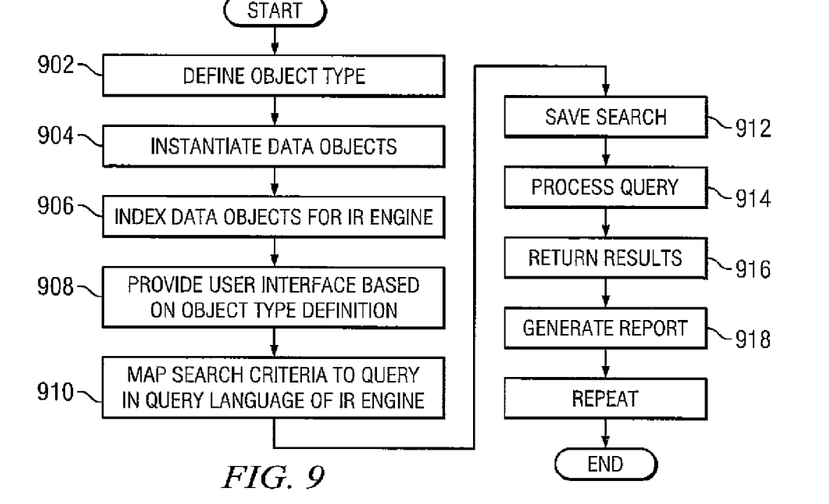
FIG. 9 is a flow chart illustrating one embodiment of a method for providing searching and reporting of semistructured data.

FIG. 9 is a flow chart illustrating one embodiment of a method for providing searching and reporting on semistructured data. The method of FIG. 9 can be implemented, for example, as a set of computer instructions stored on computer readable media (e.g., magnetic disk, RAM, ROM, optical disk, or other computer readable media known in the art) that are executable by a computer processor.

At step 902, an object type can be defined with an object type definition that includes attributes corresponding to metadata in instantiations of the object type. The attributes can correspond to dynamic metadata such that different data objects based on the same object type definition can have different metadata. A data object can be instantiated from the object type definition (step 904). The data object can contain metadata and associated values corresponding to the attributes specified by the object type definition at the time the data object is instantiated and can contain information (e.g., metadata or other information) that associates the data object to the object type. The data object can be a document, file, record or other mechanism for defining related data.

At step 906 the data object can be indexed for an information retrieval engine. Metadata and associated values can be indexed, by way of example, but not limitation, as fields (i.e., using token patterns) if supported by the information retrieval engine. Additionally, indexing can include latent semantic indexing or other indexing schemes known in the art.

A user, at step 908, is presented with a user interface, such as a GUI, that is based on the object type definition for an object type. Because the object type definition can change through, for example, the addition or removal of attributes (i.e., the specification of dynamic metadata), the user interface can be based on the current version of the object type definition for the object type. The user interface allows the user to specify search criteria, including full text search criteria and/or search criteria associated with the metadata. The user interface can further allow the user to specify reporting parameters for reporting the results of a search including, but not limited to, which data to display, the number of results, organizational information and other reporting parameters.

The search criteria, at step 910, are mapped to a query in a query language supported by the information retrieval engine. For search criteria associated with the metadata in the data objects, the search criteria can be mapped to structured query constraints for metadata indexed as fields or to unstructured query constraints that use, for example, positional data or other mechanism to essentially simulate a structured name value pair query. Using the example of FIG. 1, the search criteria associated with "Problem Category", which is indexed as a field, is mapped to the structured query "$fieldname probcategory $field-value server error $end-field", while the search criteria associated with "Resolution Date", which is not indexed as field in the example of FIG. 1, can be mapped to the unstructured pattern matching query "resolution date" NEAR-5 "2004". The full text search criteria can also be mapped to an unstructured query. The user, at step 912 can save the search criteria and/or reporting parameters as a query object.

At step 914, the information retrieval engine can process the query. In processing the query, the information retrieval engine can support, by way of example, stop lists, stemming, synonyms, wild carding, relevance, Boolean expressions, concept matching and other query processing techniques (step 916). According to one embodiment, the results can be streamed to a web browser that presents the GUI to the user.

The results of the search can be returned in a GUI. Additionally, the results can be formatted as a report based on reporting parameters specified by a user (step 918). It should be noted that the steps of FIG. 9 can be repeated as needed or desired.

Thus, a user can search data objects containing semistructured data, including dynamic metadata, using a user friendly GUI (or other user interface) that is based on the object type definition for an object type. The user specifies search criteria associated with the metadata and/or a full text search and the search criteria are mapped to the query language supported by an information retrieval engine. Search criteria associated with metadata that has been indexed as field data (e.g., using token patterns) can be mapped to a structured query constraint, while search criteria associated with metadata that has not been indexed as field data can be mapped to an unstructured pattern matching query constraint. An IR engine can process the query to search a set of data of data objects associated with the object type according to the query. Searching the set of data objects can include search mechanisms known in the art including comparing the query to an index. A set of results (e.g., a listing of data objects meeting the search criteria) can be returned to the user in the GUI, as a report, or in other suitable manners.

Figure 10:
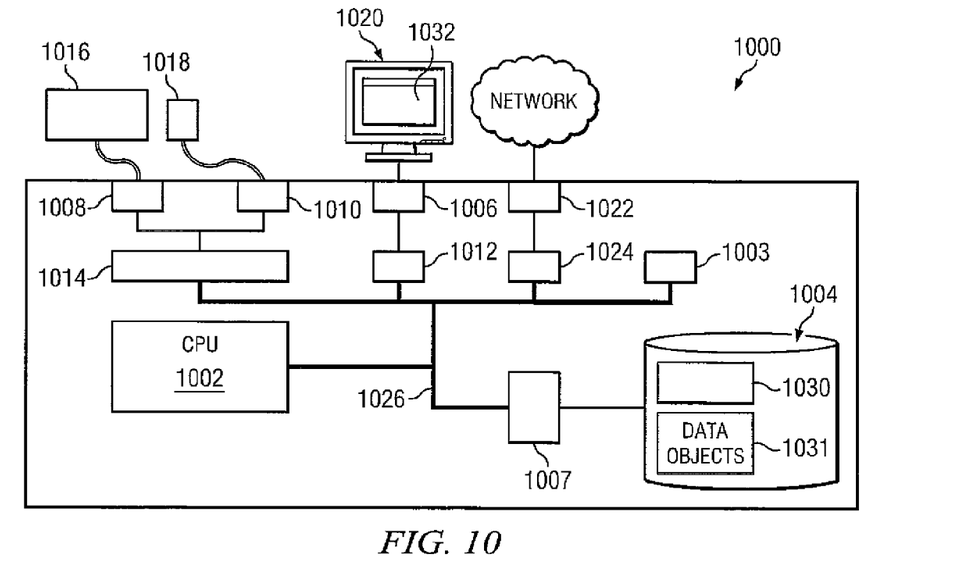
FIG. 10 is a diagrammatic representation of one embodiment of a computing device.

FIG. 10 is a diagrammatic representation of a computing device 1000 that can implement embodiments of the present invention. Computing device 1000 can include a processor 1002, such as an Intel Pentium 4 based processor (Intel and Pentium are trademarks of Intel Corporation of Santa Clara, Calif.), a primary memory 1003 (e.g., RAM, ROM, Flash Memory, EEPROM or other computer readable medium known in the art) and a secondary memory 1004 (e.g., a hard drive). A memory controller 1007 can control access to secondary memory 1004. Computing device 1000 can include I/O interfaces, such as video interface 1006 and universal serial bus ("USB") interfaces 1008 and 1010 to connect to input and output devices. A video controller 1012 can control interactions over the video interface 1006 and a USB controller 1014 can control interactions via USB interfaces 1008 and 1010. Computing device 1000 can include a variety of input devices such as keyboard 1016 and a mouse 1018 and output devices such as display device 1020 (e.g., a monitor). Computing device 1000 can further include a network interface 1022 (e.g., an Ethernet port or other network interface) and a network controller 1024 to control the flow of data over network interface 1022. Various components of computing device 1000 can be connected by a bus 1026.

Secondary memory device 1004 can be a random access device that uses a random access storage medium that can store a variety of data computer instructions that include, for example, an operating system such as a Windows operating system (Windows is a trademark of Redmond, Wash. based Microsoft Corporation) and applications that run on the operating system, along with a variety of data. More particularly, secondary memory 1004 can store computer instructions 1030 that can allow a user to run searches and reports on a set of data objects 1031 as described above. Data objects 1031 can be stored on secondary memory device 1004 or another storage media (e.g., remote storage media or other storage media known in the art). Secondary memory 1004 can also store other information including object type definitions and other information (e.g., object type definitions corresponding to attributes or any other information). During execution by processor 1002, portions of computer instructions 1030 can be stored in secondary memory 1004 and/or primary memory 1003.

In operation, computer instructions 1030 can be executable by processor 1002 to provide a graphical user interface 1032 in display device 1020. GUI 1032 can provide a graphical workspace to allow a human user, through the use of input devices 1016 and 1018, to define object types, specify various parameters associated with searching and reporting and perform other operations. Examples of GUI 1032 are illustrated in FIGS. 2-8. Based on the search criteria specified by the user, computer instructions 1030 can process a query to return search results and generate ad hoc reports.

Computing device 1000 of FIG. 10 is provided by way of example only and it should be understood that embodiments of the present invention can be implemented as a set of computer instructions stored on a computer readable medium in a variety of computing devices including, but not limited to, desktop computers, laptops, mobile devices, workstations and other computing devices.

Although the present invention has been described in detail herein with reference to the illustrated embodiments, it should be understood that the description is by way of example only and is not to be construed in a limiting sense. It is to be further understood, therefore, that numerous changes in the details of the embodiment of this invention and additional embodiments of this invention will be apparent, and may be made by, persons of ordinary skill in the art having reference to this description. It is contemplated that all such changes and additional embodiments are within scope of the invention as claimed below.

What is claimed is:

1. A method for searching semistructured data comprising:
   determining an object type to be searched;
   accessing an object type definition for the object type;
   providing a user interface to a user via a display device based on the object type definition for the object type, wherein the object type definition specifies a set of attributes representing metadata for data objects instantiated according to the object type, wherein the user interface allows the user to specify search criteria associated with the metadata;
   mapping the user search criteria to a query, wherein the query comprises at least one structured query constraint and at least one unstructured query constraint;
   processing the query to search a set of metadata for a set of data objects instantiated based on the object type according to the query, wherein each data object comprises semistructured data; and
   returning a set of results to the user over a network connection as a report based on user specified reporting parameters.

2. The method of claim 1, wherein the set of metadata comprises dynamic metadata that varies between at least two of the data objects in the set of data objects.

3. The method of claim 1, further comprising indexing the set of data objects for an information retrieval engine.

4. The method of claim 3, wherein indexing the set of data objects further comprises indexing a piece of metadata from the set of metadata using a token pattern.

5. The method of claim 3, wherein the query further comprises a structured query constraint and an unstructured query constraint.

6. The method of claim 4, wherein the at least one unstructured query constraint comprises a query constraint based on a search criterion associated with a piece of metadata.

7. The method of claim 4, wherein the at least one unstructured query constraint comprises a query constraint based on a full text search criterion.

8. The method of claim 1, further comprising storing a user specified search as a query search object.

9. The method of claim 1, further comprising presenting the user with a report interface based on the object type definition that allows the user to specify the reporting parameters.

10. A computer program product for searching semistructured data comprising a set of computer instructions stored on a non-transitory computer readable medium, wherein the set of computer instructions comprise instructions being executable by one or more machines to:

determine an object type selected;

access an object type definition for the object type;

provide a user interface to a user based on the object type definition for the object type, wherein the object type definition comprises attributes representing metadata for data objects instantiated based on the object type, wherein the user interface allows the user to specify search criteria associated with the metadata;

map the user search criteria to a query;

process the query to search a set of metadata for a set of data objects instantiated based on the object type according to the query, wherein each data object comprises semistructured data;

return a set of results to the user; and generate a report from the set of results based on user specified reporting parameters.

11. The computer program product of claim 10, wherein the set of metadata comprises dynamic metadata that varies between at least two of the data objects in the set of data objects.

12. The computer program product of claim 10, wherein the set of computer instructions further comprise instructions executable to index the set of data objects for an information retrieval engine.

13. The computer program product of claim 12, wherein indexing the set of data objects further comprises indexing a piece of metadata from the set of metadata using a token pattern.

14. The computer program product of claim 10, wherein the query comprises at least one structured query constraint based on a search criterion associated with a piece of metadata and an unstructured query constraint.

15. The computer program product claim 14, wherein the unstructured query constraint comprises a query constraint based on a search criterion associated with a piece of metadata.

16. The computer program product of claim 14, wherein the unstructured query constraint comprises a query constraint based on a full text search criterion.

17. The computer program product of claim 10, wherein the set of computer instructions further comprise instructions executable to store a user specified search as a query search object.

18. The computer program product of claim 10, wherein the set of computer instructions further comprises instructions executable to present a report interface that allows the user to specify the reporting parameters.

19. A method for ad hoc searching of semistructured data comprising;

defining an object type using an object type definition that comprises one or more attributes;

instantiating a set of data objects of the object type;

determining that the set of data objects is to be searched;

accessing the object type definition;

providing a user with a search user interface via a display device based on the object type definition, wherein the search user interface allows the user to specify search criteria comprising full text search criteria and search criteria associated with metadata;

mapping the search criteria to a query, wherein the query comprises:

at least one structured search query constraint based on a search criterion associated with a piece of metadata; and at least one unstructured search constraint;

processing the query to search the set of data objects associated with the object type according to the query;

presenting the user with a report user interface based on the object type definition that allows the user to specify report parameters; and returning a set of results over a network connection in a report based on the report parameters specified by the user.

20. The method of claim 19, wherein a set of metadata for a first data object associated with the object type is different than a set of metadata for a second data object associated with the object type.

21. The method of claim 20, further comprising saving a report definition as a query object and returning the set of results as an ad hoc report based on the report parameters.

* * * * *